Figure 1:
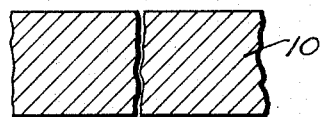

Aug. 19, 1941.  L. B. SCOTT  2,252,986
METHOD OF REPAIRING CRACKED OR FRACTURED METAL WALLS
Filed March 3, 1939  2 Sheets-Sheet 1

Inventor
Lawrence B. Scott
By Jack A. Ashley
Attorney

Aug. 19, 1941.   L. B. SCOTT   2,252,986
METHOD OF REPAIRING CRACKED OR FRACTURED METAL WALLS
Filed March 3, 1939   2 Sheets-Sheet 2

Inventor
Lawrence B. Scott
By Jack Ashley
Attorney

Patented Aug. 19, 1941

2,252,986

UNITED STATES PATENT OFFICE 2,252,986

METHOD OF REPAIRING CRACKED OR FRACTURED METAL WALLS

Lawrence B. Scott, San Antonio, Tex.

Application March 3, 1939, Serial No. 259,594

12 Claims. (Cl. 29—148)

This invention relates to new and useful improvements in methods of and means for repairing and re-enforcing cracked or fractured structures or at points of excess strain of such structures.

One object of the invention is to provide an improved method of repairing cracks and fractures in structures without the use of heat or molten metal, and involving sealing the crack or fracture with a cold flowing pliable metal.

An important object of the invention is to provide a method wherein a recess or groove is formed in the surface of the metal so as to include the crack or fracture in its bottom, and a metal repair member is placed in the recess or groove and distorted or spread in such a manner as to provide a seal for the crack or fracture, whereby the outer portion of the crack or seal will be effectively closed.

Another object of the invention is to provide in conjunction with the sealing metal a suitable packing disposed between the sealing metal and the bottom of the recess or groove in such a manner as to flow into the crack or fracture and to spread under the metal seal when distorted, whereby the repair is made highly efficient and having elastic qualities will compensate expansion and contraction, thus preventing leaks even under relatively high pressures and temperatures.

A further object of the invention is to provide a method wherein the side walls of the recess or groove are provided with pockets or sumps, some of which may have irregular or screw-threaded walls, whereby the sealing metal when spread may flow into such pockets and become locked by engagement with the irregular or screw-threaded walls, thus not only providing a more effective fastening but also giving finger-like extensions which will act in radiating heat from the repair or fracture and distributing the same into the metal wall, where such wall is subjected to heat as in an engine manifold or block, or in any other fracture.

A still further object of the invention is to provide a method of replacing oxidized and fatigued metals, at points of strain or fracture, with metals of varying lengths which have high heat resisting qualities and a great tensile and compressive strength, whereby the repaired portion will withstand high pressures and temperatures, and also will substantially prevent excessive movement of the casting as such movement would undoubtedly result in extending the fracture beyond the repair.

A still further object of the invention is to provide a method of the character described wherein a plurality of sealing metal members may be successfully applied and distorted, whereby a composite seal is built up, with or without the use of packing in the crack or fracture and between the seals, and also whereby the casting or material worked upon is strengthened.

A still further object of the invention is to provide a method of repairing or re-enforcing castings or other fractured or broken structures, whereby inherent fabricated strains are relieved, and original alinement is maintained or restored, and also whereby pressures and strains are removed from the fatigue points by distributing such pressure and strain equally over such area as is desired, such area being determined by the length of the locking material.

A construction designed to carry out the invention will be hereinafter described, together with other features of the invention.

Figure 6:
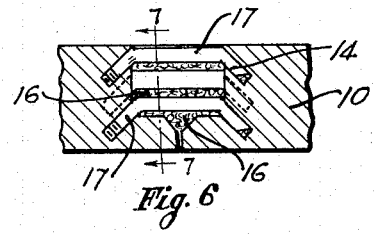
Figure 2:
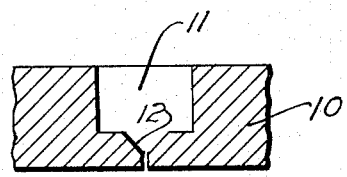
Figure 7:
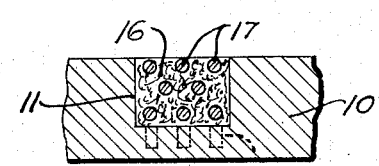
Figure 3:
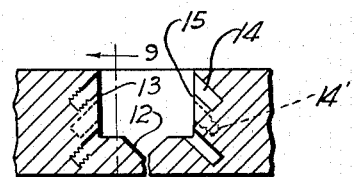
Figure 8:
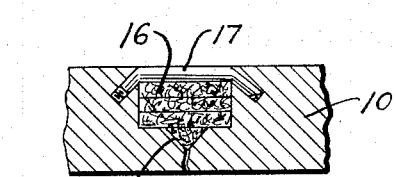
Figure 4:
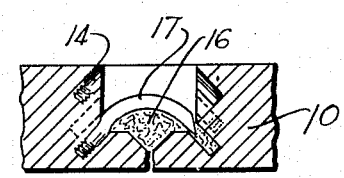
Figure 9:
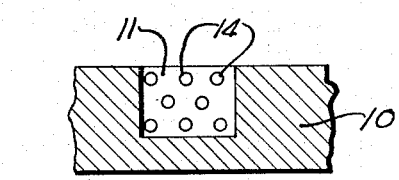
Figure 5:
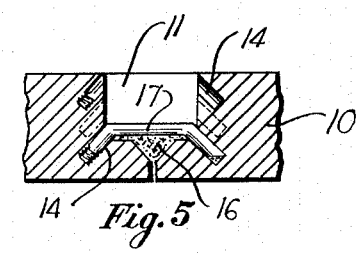
Figure 10:
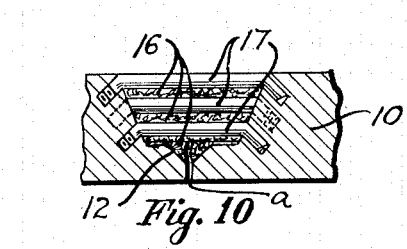
Figure 11:
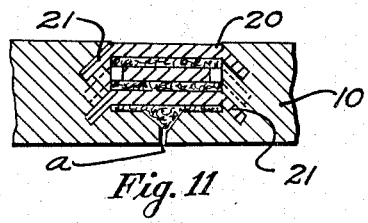
Figure 12:
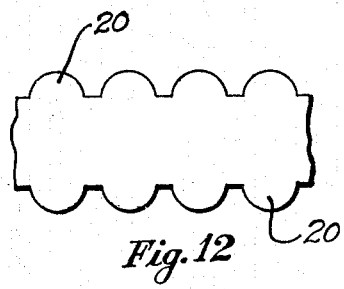
Figure 14:
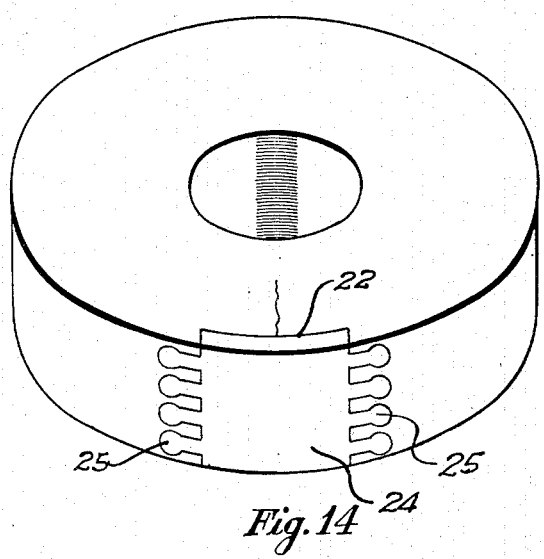
Figure 13:
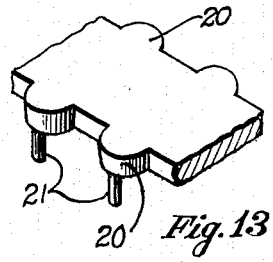
Figure 16:
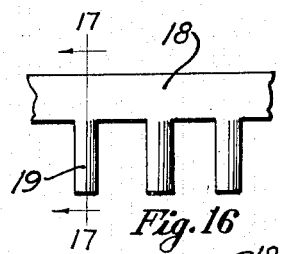
Figure 15:
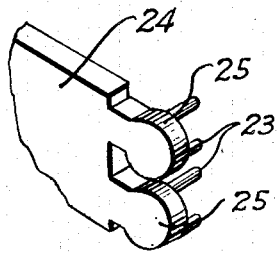
Figure 18:
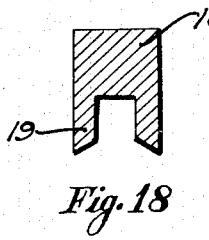
Figure 17:
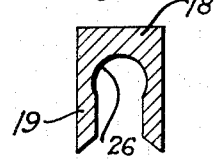
Figure 19:
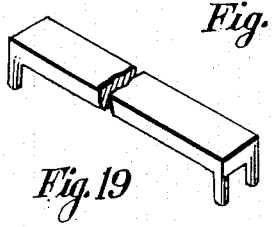

The invention will be more readily understood from a reading of the following specification and by reference to the accompanying drawings, in which an example of the invention is shown, and wherein:

Figure 1 is a horizontal, cross sectional view of a cracked casting,

Figure 2 is a horizontal, cross sectional view showing the casting cut out in accordance with this invention, Figure 3 is a horizontal cross sectional view showing a casting to be repaired in accordance with this invention, Figure 4 is a horizontal cross sectional view wherein there is shown a method of inserting the sealing means to be disclosed in this invention, Figure 5 is a horizontal cross sectional view similar to Figure 4 wherein there is shown the sealing means in place, Figure 6 is a horizontal cross sectional view wherein the crack in the casting is sealed in accordance with this invention, Figure 7 is a vertical cross sectional view taken on the line 7—7 of Figure 6, Figure 8 is a horizontal cross sectional view showing another method of sealing a cracked casting, Figure 9 is a vertical cross sectional view taken on the line 9—9 of Figure 3, Figure 10 shows another form of sealing a cracked casting, Figure 11 shows still another form of sealing a cracked casting, Figure 12 is an enlarged plan view of one of the types of sealing means, Figure 13 is an enlarged isometrical view of a construction of one type of sealing means, Figure 14 discloses another form of the invention, Figure 15 is an enlarged isometrical view of the sealing means shown in Figure 14, Figure 16 is an enlarged view of a type of sealing means, Figure 17 is a vertical cross section taken on the line 17—17 of Figure 16, Figure 18 is a cross sectional view of another form of the sealing means shown in Figure 16, and Figure 19 is still another form of a sealing means.

As is well known, metallic castings become weakened under compressive and tensile stress at points of strain and ultimately become fractured or broken unless properly repaired, therefore, the casting is useless and must be discarded and replaced with a new one. Difficulty has been experienced in repairing weakened or fractured and broken castings in such a manner that the repaired portion will withstand heat and high pressures. It is pointed out that the metal surrounding the break oftentimes becomes burnt, oxidized or fatigued, with the result that such metal must be replaced in order to properly repair the casting. With the method, hereinafter described, the present disadvantages are overcome and the fractured casting may be repaired to substantially restore it to its original condition.

The numeral 10 designates a casting having a fracture or crack A therein. To obtain a flush seal on the outer side of the casting, a groove or recess 11 is cut in the casting and overlies the fracture A. It is pointed out that the cutting of this recess or groove does not impair the casting due to the fact that the opening is in the line of strain to be repaired. A substantially V-shaped trough 12 is formed in the bottom of the recess 11 and as is clearly shown in Figure 3, the fracture or crack A is located centrally of the trough, whereby the side walls of the trough incline outwardly and upwardly therefrom. A plurality of staggered pockets or holes are formed in the vertical side walls 13 and 15 of the recess 11 and these holes are inclined, being preferably disposed at an angle of substantially 45 degrees from the surface of the walls 13 and 15. The holes are preferably formed in horizontal rows (Figure 9) and each row of holes is staggered or offset with relation to the adjacent rows. Every other one of the pockets or holes 14 in each row of said pockets may be internally screw-threaded or may be serrated so as to provide a roughened interior surface. For filling the recess 11 and repairing the fracture or break A, a plurality of packing bars 17 are provided. Each packing bar is adapted to be inserted into the recess, with its ends engaging within the pockets or sumps 14, whereby said packing bars extend transversely across the recess above the fracture. Each packing bar may have one of its ends externally screw-threaded so that it may be screwed into one of the pockets 14, the other end of said bar being smooth and insertable into the pocket in the opposite wall of the recess. In disposing or locating the bars, one of said bars has its end threaded into one of the pockets 14 in the lowermost horizontal row in the side wall 13. The opposite or smooth end of the bar is then entered into the pocket directly opposite the first pocket and located in the opposite wall 15 of the recess. After this first bar is so positioned, another bar is inserted into the adjacent openings 14 of the same row, whereby the two bars lie contiguous to each other with their longitudinal edges abutting. The entire lowermost row of openings then receives additional bars whereby a lowermost layer of bars is inserted.

After this first or lowermost row of bars is inserted in the recess, a second layer of bars 17 is inserted in the same manner, the ends of the bars of this second layer engaging in the next horizontal row of openings 14. These latter openings are staggered with relation to the openings which receive the lowermost layer of bars and, therefore, the bars in the second layer will overlie the abutting edges of the bars in the lowermost layers. The remaining layers, each consisting of a plurality of bars, are then inserted in the subsequent rows of the pockets 14 and 14'. It is preferable that the bars of the lowermost row have their screw-threaded ends engaging in the pockets 14 in the side wall 13, while the next above layer has the ends of its bars threaded into the openings in the opposite side wall. Thus, the screw-threaded ends of each layer will overlie the smooth or non-screw-threaded ends of the adjacent rows.

However, it is pointed out that this method will function without screw-threading or serrating the interior surface of said pockets, that is, leaving the pockets as they are originally drilled and merely placing the ends of the bar 17 in said opening and then compressing the bar downwardly in the opening 11 allowing the ends to fill up the opening.

In repairing castings with this method a suitable pliable packing material 16, such as pliable metal or substance, may be used. The packing material 16 is placed in the V-shaped opening 12 and the bar 17 has one end screwed in the opening 14 of the side wall 13 and the outer end of the leg bent downwardly so that it may enter the opposite openings 14 in the opposite side wall 13. Then a suitable instrument (not shown) is employed to move the unattached end downwardly into the opening or pocket 14, thereby the bar will come in contact with the packing 16 and flow the same along the bottom of the recess, and, of course, some of it will enter into the pockets as can be seen in Figure 5. A similar packing rod is screw-threaded into the opposite wall from the first bar in the next row of pockets 14' and a suitable packing material is placed beneath said rod and the same is driven downwardly as can be seen in Figure 6, and so on until the recess is filled. It is pointed out that any number of pockets may be provided in the side walls 13 and each row is completed before the next succeeding row is started; thus, it can be seen in Figure 9 that it is possible to have five rows of bars or any number desired.

It is pointed out that with this method of sealing a fracture that more sealing surface is obtained as the fluid or gas must pass up through the fracture and beneath the packing material into the pockets 14 and then up to the next succeeding row of bars where they must pass down into the pockets 14' then up through the next series, and so on; thus, since fluid must travel a circuitous and undulating path, it is substantially impossible for the fluid to escape or in the instance where there is a high pressure for the pressure to blow the packing out of the recess.

This method of repairing a cracked casting is particularly adaptable where internal combustion engine cylinders have been scored or broken due to the fact that the uppermost packing bar may be ground off and be flush with the side walls of said cylinder.

The recess that is illustrated in Figure 2 is not necessarily limited to a vertical side wall as it is obvious that the side walls may be inclined as shown in Figure 10. Further, it is pointed out that the bars 17 need not extend transversely across the fracture, as the pockets 14 and 14' could be drilled at the ends of the recess, in which case, the rods would extend longitudinally of the recess and parallel to the fracture A. If desired, the pockets 14 may overlap each other. As can be seen in Figure 14, the lower-most row of sealing bars will have one of their ends screw-threaded and the next row of bars immediately above the lower-most row will have their openings 14 so drilled that said second row of recesses 14 will intersect and penetrate into the ends of the bars located in the lower-most row, thereby it will be possible to screw-thread the openings intersecting the non-screw-threaded ends of the lower-most rods, positively locking each rod in place. The method is not to be limited to the placing of the recess 11 so that said recess overlies and extends parallel with the fracture, as said opening may be cut across said fracture as well as parallel to said fracture and with this type of repair it is possible to place the strain over a larger area of the casting than would be possible in the use of the opening which lies parallel with the fracture. It is pointed out that the cutting of this recess or groove does not impair the casting as the length of the lock inserted in the groove would distribute the strain over to other portions of the parent metal and in inserting a lock in this type of groove the procedure hereinbefore set out is used and a description of such procedure is not deemed necessary.

Another way of employing this method would be the cutting of a recess 11 and inserting a packing material in said groove and then the drilling of the holes in the wall at the top of the recess and inserting the bars in this set of pockets as can be seen in Figure 8.

It is pointed out that various types of sealing metal may be used and in some instances it may be desirable to place a bar lengthwise of said crack and an elongated bar such as is shown in Figure 13 may be used. The bar 18 has depending lugs 19 thereon and in the use of such a bar the opening 11 is formed in the casting and the holes 14 and 14' are drilled in the side walls thereof so as to permit the lugs 19 to enter said openings thereby locking said sealing means in the casting. Obviously, packing may be inserted beneath the bar 18 as is shown in Figures 4 and 5.

In Figure 12, another type of sealing bar 20 is shown and this bar has a plurality of enlarged portions or semi-circular lugs 21 formed integral. The lugs are disposed in spaced relation throughout the length of the bar at its longitudinal edges and each lug has a pair of depending pins 22 thereon. This type of bar is inserted in a recess cut to conform with the shape of the rod, also said recess or groove is provided with openings such as is shown in Figure 12 and it is pointed out with this type of bar that a horizontal strain as well as a vertical and longitudinal strain is taken by the bar and substantially prevents movement of the metal walls in any direction.

In many instances, the structure or shape of the casting is such that adequate space is not available to permit repair of the crack in the manner as above set forth. Such a casting is shown in Figure 14, where the fracture occurs between the edge of the casting and a cylindrical opening. In this case, the vertical edge of the casting is cut out or recessed at 22, said cut-out portion having its ends formed with laterally extending sumps or recesses 23. An enlarged bonding element 24 is adapted to fit within the cut-out portion 22 and is provided with lugs 25 at its ends, said lugs being enlarged at their outer ends. The recesses 23 are enlarged at their inner ends so as to receive the lugs and manifestly said lugs serve to lock the element in place, thereby allowing the repair of a casting wherein adequate space does not permit the use of the above set forth method and it is pointed out that the small locks such as shown in Figure 12 may be inserted on the top of the casting as the room available permits and these are inserted as above set out. In many instances the metal surrounding a crack or fracture has become oxidized or weakened to such an extent that the same is not provided with a suitable foundation for the bar to hold in; therefore, it is very desirable to have an elongated bar having depending lugs at its extreme ends as is shown in Figure 16. By using this type of bar it is possible to repair a fracture where the surrounding metal has become oxidized and weakened and distributes the strain to the good metal beyond the fatigued metal. It is pointed out that in the use of the depending lugs as set out in the various methods above that said depending lugs may be in various angles in relation to the bar itself, for example, the lugs may be at right angles to the bar or they may depend at 45° angles from the bar in either direction as the work being done would require.

It is pointed out that a casting whether old or new usually becomes fractured or broken by a breaking action and not by pulling or tensile action. It is also a fact that castings do not always crack from lack of strength, but crack from pressures or strains which are greater on the surface, and consequently metals under such conditions develop surface cracks which ultimately rip or tear large areas. By inserting the locks herein described, the breaking action in the metal is more or less changed to pulling action and as is well known it takes a much greater pulling action to part a material than it does to bend the same and break it. Many castings in the process of fabrication possess inherent strains which tend to weaken or pull toward the weakest point. The locks which are installed at such points act to relieve this fabricated strain by reenforce the weakened points. It is further pointed out that by the use of this method the opening 11 does not extend entirely through the casting thereby leaving a portion of the parent metal around the repair and adding a firm support for the repair locks. In undercutting the opening 11 a certain amount of the oxidized metal is removed and then by drilling the opening 14 in the side walls of the opening 11 the lugs of the lock penetrate further into the good metal and do not rely on the oxidized metal which would in most instances not be sufficient to hold the lugs in the casting.

The bar which is shown in Figure 16 may be provided on the under side of said bar with a recess 26 which would lie between the depending lugs 19 as shown in Figure 17. Such a recess would enable the user to place a suitable packing in said recess so as to eliminate the placing of the packing within an opening and place the sealing means on top of said packing as above set out. It would only be necessary for the user to insert the bar and when said bar was forced down into the opening the packing would strike the wall of said opening and continued pressure would cause the packing to flow as in the method hereinabove set out.

Various changes, alterations and modifications may be made in the size, shape and arrangement of the herein described elements, within the scope of the appended claims.

What I claim and desire to secure by Letters Patent is:

1. The method of repairing fractures in walls without heat which includes, removing a portion of the fractured wall to form an opening having the fracture exposed therein, forming a plurality of recesses and directing them laterally into the side walls of said opening, inserting pliable metal sealing means into the opening and recesses for locking said sealing metal in said opening.

2. The method of repairing fractures in walls without heat as set forth in claim 1, with the step of packing off the fracture between the metal walls and the sealing metal.

3. The method of repairing fractures in walls without heat which includes, removing a portion of the fractured wall to form an opening having the fracture exposed therein, forming a plurality of recesses and directing them laterally into the side walls of said opening, inserting pliable metal sealing means into the opening and causing the same to cold flow into the recesses for locking said sealing metal in said opening.

4. The method of repairing fractures in walls without heat as set forth in claim 1, together with providing some of the recesses with screw-threads, and providing the sealing metal with screw-threads for engaging in the threads of the recesses to more securely lock the sealing metal in place.

5. The system of repairing fractures in walls without heat which includes, cutting out a portion of the fractured wall contiguous to the fracture to form an opening thereabout, drilling a plurality of holes into the walls of said opening, inserting pliable sealing metal in said opening having lugs thereon for engaging in said holes, and distorting said sealing metal so as to cause the same to cold flow into said holes and to spread in said opening, thereby sealing the fracture and locking said sealing metal in the opening.

6. The system of repairing fractures as set forth in claim 5, with the step of packing off the fracture with a packing material disposed between the sealing metal and said fracture.

7. The method of repairing fractures in walls without heat which includes, removing fatigued material on each side of the severance to form an opening, bridging the severance, packing said opening to pack off the severance, and distorting ductile metal in said opening over the packing to confine and deform said packing and to seal the opening and the severance.

8. The method of repairing fractures in walls without heat which includes, removing the fatigued material along each side of the severance for forming a longitudinal opening, also removing material to extend the opening transversely for providing locking surface, filling said opening and bridging across said severance with ductile metal by distorting said metal so as to cause it to flow into intimate contact within the walls of said opening to seal the severance, and packing off the severance between the wall and the ductile metal.

9. The method of repairing metal without heat which includes, removing a portion of the wall to form an opening, forming a plurality of recesses and directing them laterally into the side walls of said opening, inserting pliable sealing means into the opening and recesses for locking said sealing metal in said opening.

10. The system of repairing metal without heat which includes, cutting out a portion of the metal contiguous to the place to be repaired to form an opening thereabout, drilling a plurality of holes into the walls of said opening, inserting pliable sealing metal in said opening having lugs thereon for engaging in said holes, and distorting said sealing metal so as to cause the same to cold flow into said holes and to spread in said opening thereby sealing the opening and locking said sealing metal in said opening.

11. The method of repairing metal without heat which includes, cutting out a portion of the wall to form an opening, forming a plurality of recesses in the wall of said opening, inserting pliable sealing metal in said opening, and distorting said sealing metal so as to cause the same to cold flow into said recesses and to spread in said opening thereby sealing the opening and locking said sealing metal in said opening.

12. The method of repairing fractures in walls without heat which includes, removing a portion of the fractured wall to form an opening having the fracture exposed therein, forming a plurality of recesses and directing them laterally into the side walls of said opening, inserting a pliable sealing metal into the opening, and cold flowing said sealing metal into said recesses so that the metal is locked and seals the opening.

LAWRENCE B. SCOTT.